INVENTOR
ANTHONY J. LARRECQ
BY
ATTORNEY

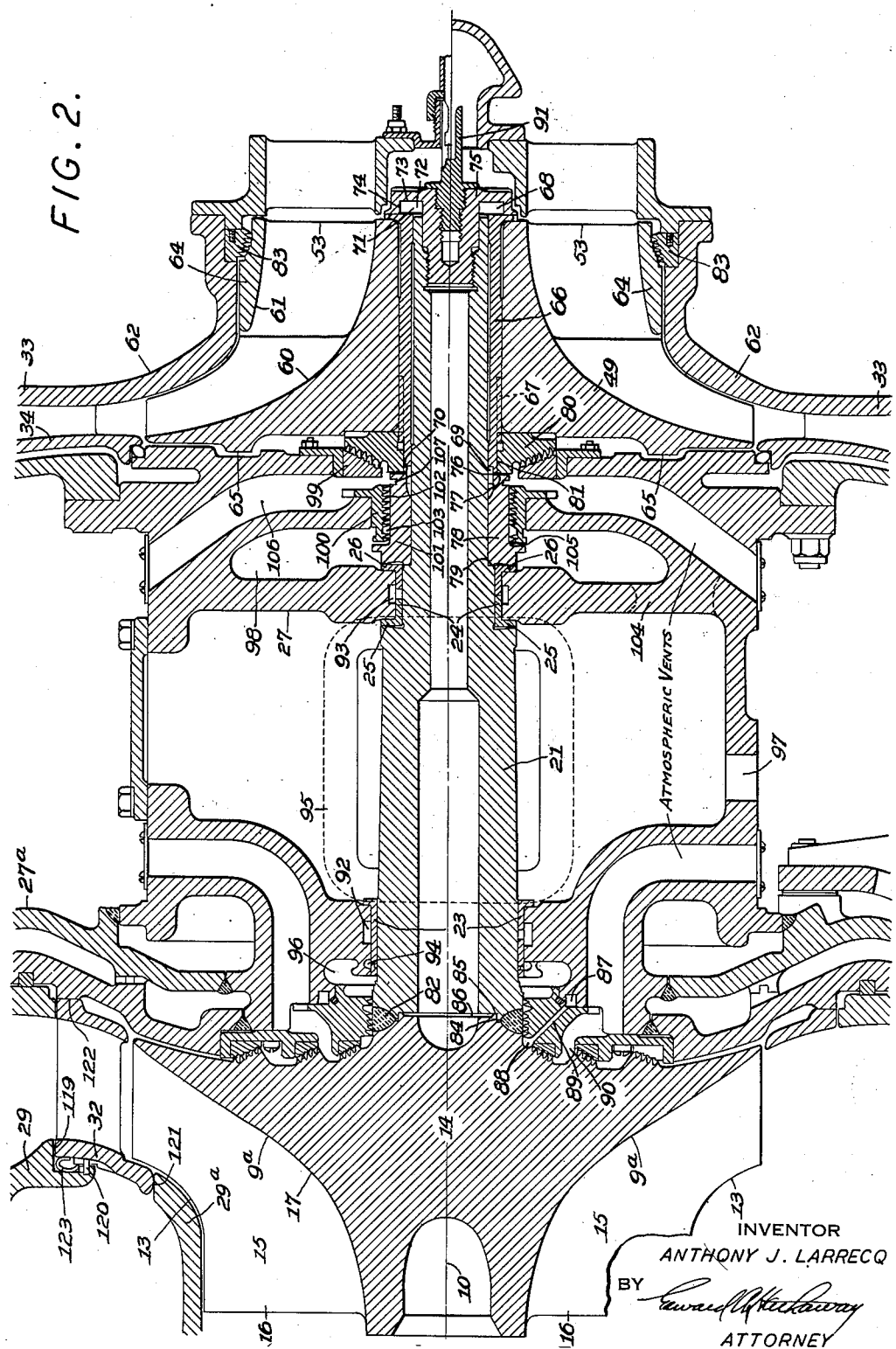

Feb. 2, 1954 — A. J. LARRECQ — 2,668,006
TURBOCHARGER
Filed Nov. 8, 1949 — 5 Sheets-Sheet 3

INVENTOR
ANTHONY J. LARRECQ
BY
ATTORNEY

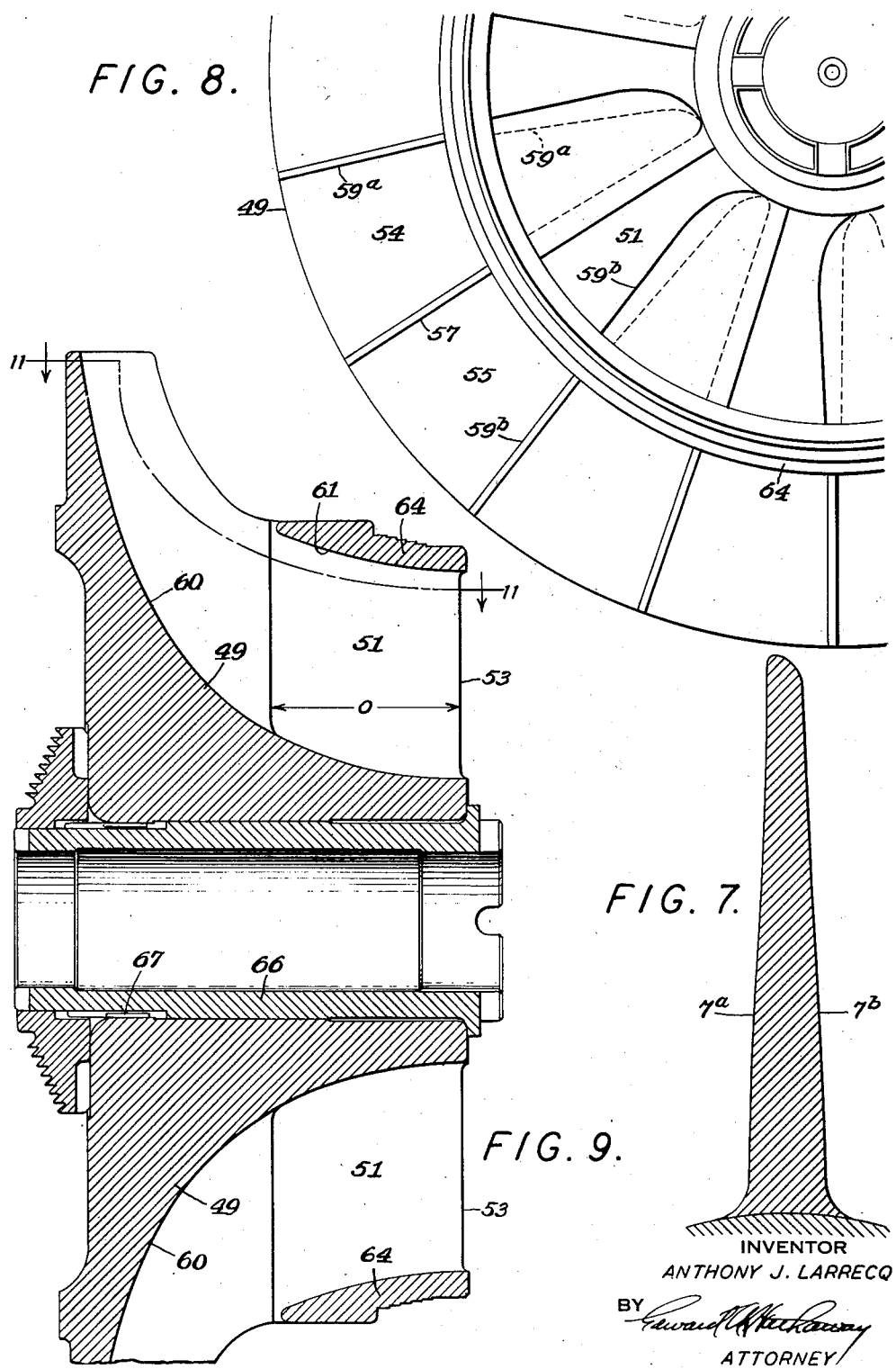
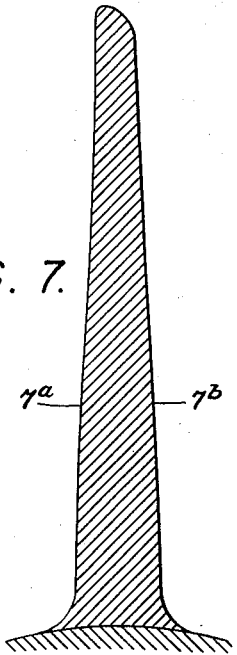
INVENTOR
ANTHONY J. LARRECQ
BY
ATTORNEY

INVENTOR
ANTHONY J. LARRECQ
BY
ATTORNEY

Patented Feb. 2, 1954

2,668,006

UNITED STATES PATENT OFFICE 2,668,006

TURBOCHARGER

Anthony J. Larrecq, Yardley, Pa., assignor to Baldwin-Lima-Hamilton Corporation, a corporation of Pennsylvania Application November 8, 1949, Serial No. 126,109

9 Claims. (Cl. 230—116)

This invention relates generally to turbochargers and more particularly to an improved type of internal combustion engine exhaust gas turbine driven turbocharger wherein a multiplicity of engine exhaust manifolds are employed, each manifold communicating with individual nozzle segments which in turn cooperate with an elastic fluid turbine designed to convert the kinetic energies of the combustion turbine exhaust gases to mechanical work required for driving an air compressor.

An object of the invention is to provide a turbocharger of the type described having an improved relationship of the turbine, compressor and supporting shaft elements, whereby the stresses occurring in the turbine wheel are minimized without compromising the ability of the turbine wheel to efficiently absorb the kinetic energy imparted by the engine exhaust gases under the conditions of pressure fluctuation existing in the separately divided multiple engine exhaust manifolds.

Another object is to provide a turbocharger of the type described having an improved relationship of the turbine, compressor, and supporting shaft elements, whereby the turbine and compressor elements can be outboard of the shaft supporting bearings contained in a common structure wherein the bearing alignment is unaffected by disassembly.

A further object is to provide a turbocharger of the type described having an improved relation of turbine wheel and cooperating nozzle ring wherein the latter can be readily replaced to accommodate the varying conditions of internal combustion engine exhaust gas pressure fluctuations.

A still further object is to provide a turbocharger of the type described having an improved combination employing an enclosure for the nozzle ring support with sealing connections thereto of such construction as to effectively prevent the egress of high pressure exhaust gases into the enclosure which receives the exhaust gases from the turbine wheel.

Another object is to provide a turbocharger of the type described having an improved combination of labyrinth chambers cooperating with the turbine wheel and the rear part of an enclosure for receiving gases discharged from the turbine wheel, to the end that compressor discharge air can be supplied to the rear of the turbine wheel and separately to the bearing housing with intervening atmospheric vent, all to the end of preventing the mixing of hot exhaust gases and oil vapor.

A further object is to provide a turbocharger of the type described having a rotating impeller with entry vanes integral with alternate discharge vanes, said entry vanes cooperating with an integrally cast shroud permitting multiple seals on the periphery thereof, to the end of minimizing air leakage and thereby improving the impeller efficiency.

Other objects and advantages will be apparent to those skilled in the art from the following description of the accompanying drawings in which:

Fig. 2 is a similar view, enlarged, of the turbine wheel, the compressor impeller, and the supporting shaft;

Figure 5:
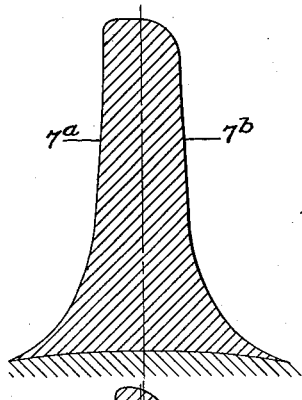
Figure 6:
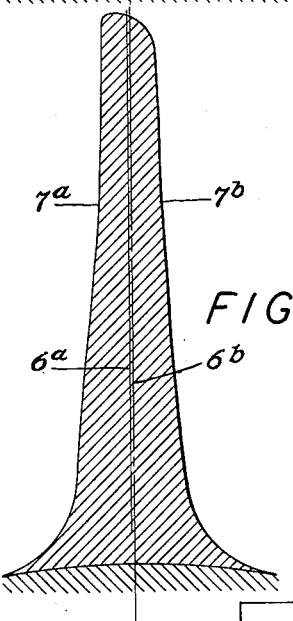
Figure 4:
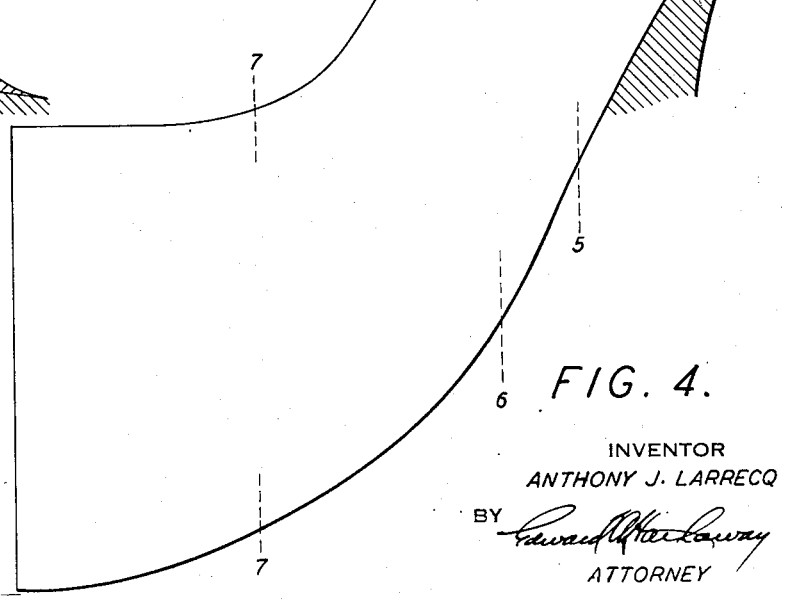
Fig. 4 is an elevational view of one of the turbine blades.
Figures 10, 11:
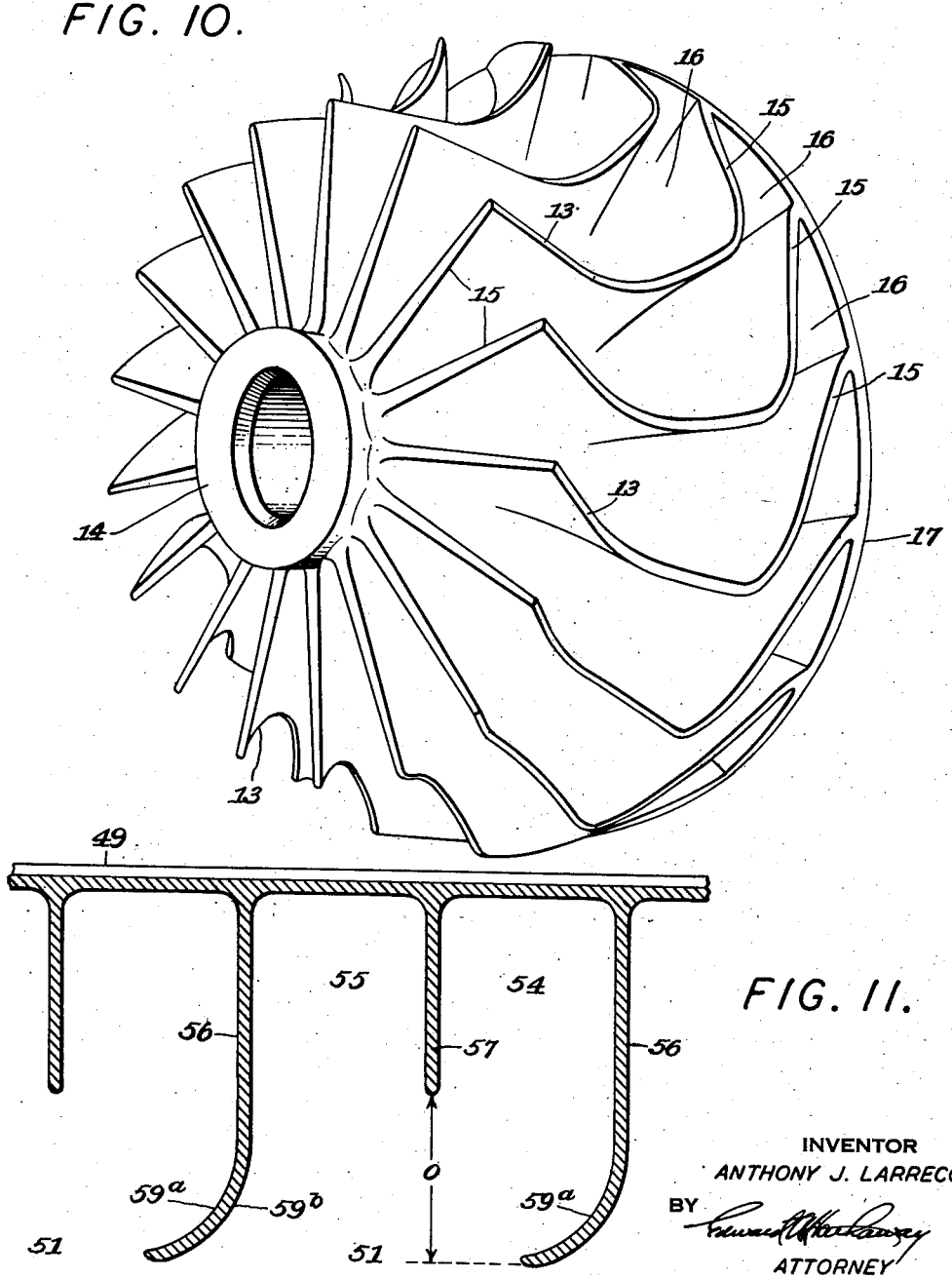

Figs. 5, 6 and 7 are cross sectional views of a turbine blade showing the varying contours thereof, taken along the lines 5—5, 6—6, and 7—7 respectively of Fig. 4;

Fig. 8 is a partial, enlarged end view of the compressor impeller;

Fig. 9 is an enlarged sectional elevation of the compressor impeller, showing the impeller sleeve;

Fig. 10 is a perspective of the turbine wheel; and

Fig. 11 is a diagrammatic view of the vanes of the compressor impeller, taken along the line 11—11 of Fig. 9.

Figure 1:
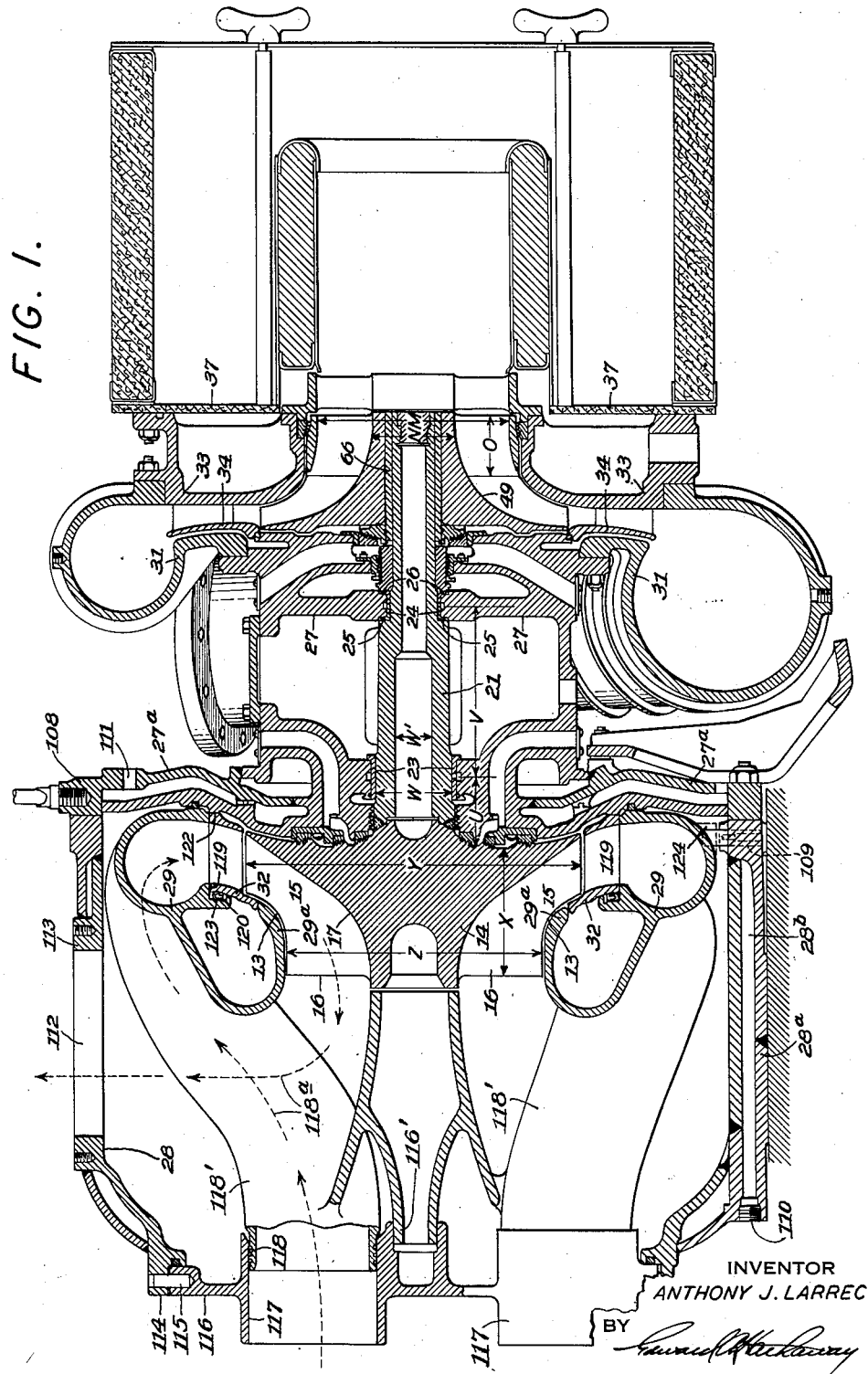
Fig. 1 is a vertical sectional view of my improved turbocharger.
Figure 3:
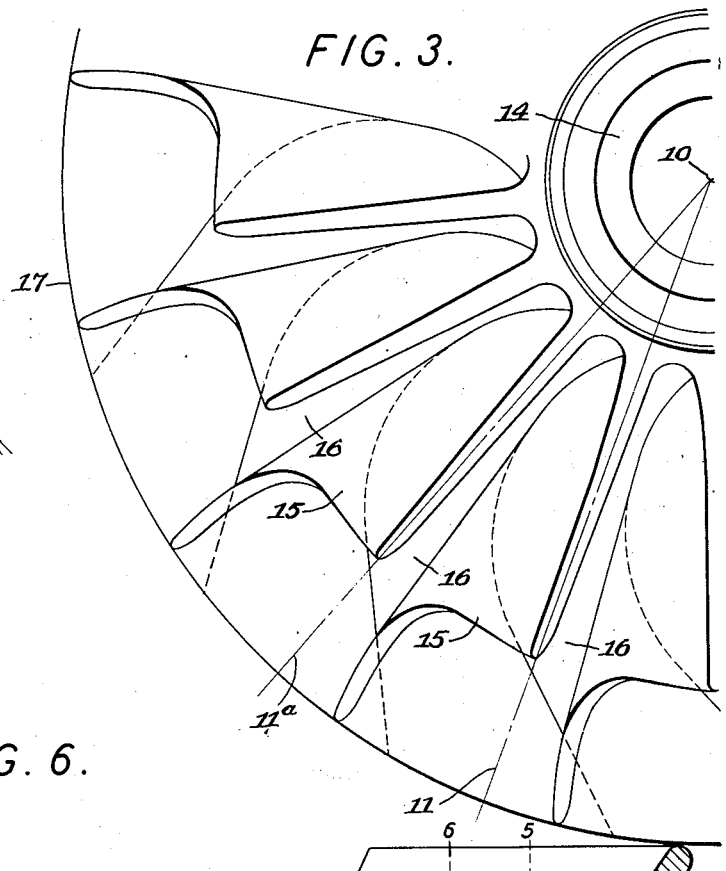
Fig. 3 is a partial, enlarged end view of the turbine wheel.

In the particular embodiment of the invention which is disclosed herein merely for the purpose of illustrating one specific form among possible others that the invention might take in practice, I show in Figs. 1 and 2, in compact arrangement, a single stage turbine element 17, a single stage compressor impeller 49, with an interconnecting shaft 21, supported on journal bearings 23 and 24 and fixed by thrust bearings 25 and 26, contained in a common bearing support housing 27 which itself includes a turbine exhaust chamber back-plate 27a connecting with a turbine exhaust chamber 28, Fig. 1, enveloping a nozzle support housing 29. Bearing housing 27 supports a compressor collector chamber 31 cooperating with a support plate 33 to which is attached a diffuser 34 and an air filter 37. Referring more particularly to Figs. 3 and 10, turbine wheel 17, comprises a multiplicity of passages 16 bounded on two sides by vanes 15, projecting from a central hub 14 which constitutes the third side of the vane passage. The remaining or fourth side of the multiple vane passages is defined by an outer contour 13 of the vanes, which outer contour 13 itself conforms to the shape of a cooperating adjacent stationary shroud 29a, Figs. 1 and 2, which is a part of nozzle ring support 29. The surfaces of vanes 15, Figs. 3 and 10, are warped with respect to radial planes 11 and 11a, passing through turbine axis 10 and planes transverse thereto. At any transverse plane 9a, Fig. 2, the vane surfaces are defined by contour shapes 7a and 7b, Figs. 5 to 7, wherein it will be seen that the thickness of the vane progressively increases towards the root thereof. The surfaces of vanes 15 are so warped as to permit entry without shock into vane passages 16 of the exhaust gases discharged from a nozzle ring 32, Fig. 2. Vane passages 16 are also so warped as to permit egress of exhaust gases in substantially axial direction relative to nozzle support housing 29. The degree to which the vane surfaces are warped is limited by the permissible vane root stress which is adversely affected by a combination of centrifugal and bending stress arising from the displacement of vane section centroids 6a and 6b, Fig. 6, relative to radial planes 11 and 11a passing through turbine axis 10. The greater the degree of warping in vane passages 16, the greater will be the energy absorbing capacity of a turbine wheel for a given peripheral velocity. The optimum degree of vane warping depends upon the interrelationship of turbine wheel axial depth X, Fig. 1, and the turbine wheel diameters Y and Z. Turbine shaft lengths are U and V and turbine shaft diameters W and W'. For internal combustion engines having four (4) exhaust manifolds, the optimum combination of these parameters lies within the approximate limits defined by the following table, it being understood that while the figures of this table and of other values appearing elsewhere herein are carried to the third decimal point, yet this is merely by way of illustration of one specific example and variations thereof may be made within the scope and spirit of my invention.

|  | X | Y | Z | U | V | W | W' |
|---|---|---|---|---|---|---|---|
| Lower Limit | .293 | 1.000 | .814 | .214 | .560 | .200 | .060 |
| Upper Limit | .388 | 1.000 | .763 | .200 | .525 | .219 | .094 |

Compressor impeller 49, Figs. 1, 2, 8, 9 and 11, comprises a multiplicity of passages 51 bounded at inlet 53 by surfaces 59a and 59b of vanes 56, Figs. 8 and 11, bounded by hub contour 60, Figs. 2 and 9, and bounded by shroud contour 61. Multiple impeller passages 54 and 55 are continuations of passages 51 and joining the latter at a distance O, Fig. 1, beyond inlet 53, extending to the periphery of rotating impeller 49, conforming to cooperating contour 62, Fig. 2, of impeller inlet housing 33. Thus impeller passages 54 and 55 are divided by a partition 57, Figs. 8 and 11, which extends from a point where the passages meet to the periphery of rotating impeller 49. The centroid of impeller vane sections 59a and 59b at a distance beyond dimension O from the inlet lie substantially in a common radial plane relative to the impeller axis. The centroid of vane surfaces 59a and 59b in the section defined by dimension O lie substantially in parallel radial planes passing through the impeller axis. The necessary degree of warping of the vane passage relative to the radial plane passing through the discharge of vanes 55 depends upon the relationship of axial air velocity, impeller peripheral speed, and the ratio of dimensions M and N, as well as dimension O. The optimum combination of these parameters for the previous mentioned optimum combination of turbine parameters is indicated by the table below:

|  | O | M | N |
|---|---|---|---|
| Upper Limit | .198 | .627 | .254 |
| Lower Limit | .141 | .538 | .238 |

A shroud 64, Fig. 2, provided at the inlet periphery of impeller 49 effectively eliminates vibration induced by the impingement of air upon inlet edges of the impeller vanes and also permits removal of metal for balancing purposes and also permits use of a labyrinth 83 to minimize air leakages. Impeller 49 is further provided with excess metal at point 65 for balancing, said balancing being further facilitated by provision of sleeve 66 as a permanent sub-assembly, shrunk therein and held in relative angular position by means of splines 67. The provision of sleeve 66 permits the use of lightweight metals for impeller 49 without comprising the possibility of actual interchangeable fitting on shaft 21. Impeller sleeve 66 is so formed as to permit absorption of angular torques by pins 68 and which effectively transmit torque from shaft 21, said pins being held in position by prongs 70 and 71 on sleeve 66, prongs 72 on shaft 21, and by enclosing surfaces 73 and 74 of nut 75. The axial position of impeller sleeve 66 and therefore the axial position of impeller 49 is determined by the abutment of sleeve surface 76 against surface 77 of a thrust collar 78 which itself butts against shaft surface 79. The angular relationship of thrust collar 78 and impeller sleeve 66 is determined by pin 69. Interspersed between thrust collar 78 and impeller 49 is a labyrinth seal 80 which is itself readily removable from sleeve 66 by virtue of an indexing spline and radial positioning pilot 81. The material for labyrinth seal 80 can differ from that of impeller 49 and impeller sleeve 66. The material of thrust collar 78 should preferably be the same as impeller sleeve 66 and shaft 21 and all of which should be subject to hardening by heat treatment.

Referring more particularly to Fig. 2, it will be seen that turbine shaft 21 is attached to turbine wheel 17 by means of a weld 82, the separation therefor being such as to provide heat dam, comprising a pilot 84, an abutment 85, and an air gap 86. Before said heat dam is supplemented by cooling air holes 89 communicating with a chamber 87 and a chamber 88, the latter chamber communicating with a chamber 90 at which point pressure is less than in chamber 88.

Impeller shaft nut 75 can be provided with a tachometer extension connection 91 cooperating with a tachometer shaft to permit registering the speed of shaft 21.

Shaft 21 is supported in journal bearing 23 and thrust bearing 24, each of which is supported in common bearing housing 27. Oil is supplied to journal bearing 23 from annular groove 92 and bearing housing 27, said annular groove 92 being supplied by any suitable external source which also supplies a channel communicating with an annular groove 93 communicating with journal thrust bearings 25 and 26. Oil discharged from journal bearing 23 is collected in part in a chamber 94 and in part in a chamber 96. Oil collected in chamber 94 is allowed to pass to chamber 96 at the bottom of the former; the collected oil is thereupon allowed to collect in a chamber 95, from whence it is drained through an opening 97. Oil discharged from thrust bearings 25 and 26 is collected either in chamber 95 or a chamber 98, all oil collected in the latter being eventually drained to the former chamber through a channel 104. The diameter of journal bearing 23 is such as to permit the removal of shaft 21 after removal of shaft nut 75 and impeller assembly and impeller sleeve assembly 49 to 66, seal 80 and thrust collar 78, the latter being disassembled only after removal of an impeller carbon seal 99 and impeller oil seal 100.

The egress of oil vapor from bearing housing 27, Fig. 2, is eliminated by the provision of impeller oil seal 100 which comprises thread elements 101 and labyrinth elements 102. Impeller oil seal 100 also contains channel 103 which collects oil dripping from the walls of bearing chamber 98, thus effectively preventing said oil falling upon thrust collar 78. Impeller seal 100 also is provided with chamber 98 which communicates with the bottom side of the channel 104 to deliver oil liquid to bearing housing 27. Thrust collar 78 is provided with a slinger to minimize the possibility of oil flowing along surface 105. Any oil lodged on said surface is effectively wiped by thread elements 101 and any residual adhering oil is effectively thrown off into a chamber 106 by a groove 107.

The entire exhaust gas turbine driven turbocharger assembly is supported by a base 28a, Fig. 1, of water-cooled exhaust housing 28. The subassembly shown by Fig. 1 mounts to water-cooled exhaust housing 28 by means of a bolting flange 108 which is integral with water-cooled backplate 27a of bearing housing 27. Nozzle support chamber 29 is itself supported in water-cooled exhaust chamber 28 by means of radial pins 109 extending from water-cooled exhaust housing 28 inwardly and cooperating with radial sockets in exhaust housing 29, all lying in a plane parallel and adjacent to aforesaid bolting flange 108.

Water-cooled exhaust housing 28 is provided with interstices 28b wherein the water is allowed to circulate by thermosyphon action, and to which cooling water is admitted to a lower inlet flange 110 and emitted at an upper outlet flange 111. The exhaust gases discharged from exhaust housing 28 pass through opening 112 provided with a flange 113 to which a pipe connection can be made. Water-cooled exhaust housing 28 is also provided with a support face 114 containing multiple radial pins 115 extending inwardly and cooperating with radial sockets in an exhaust housing end plate 116.

Exhaust housing end plate 116 cooperates with water-cooled exhaust housing 28 to contain the exhaust gases discharged from turbine element 17. Exhaust housing end plate 116 also helps to support nozzle support housing 29 by means of a central extension 116' axially slidable in a bore of the wall. Also, this supporting action is effected by bored axial sockets 117 in which piston ring seals 118 are contained to further retain exhaust gases emitted from turbine element 17, regardless of differential thermal expansions between nozzle support chamber 29 and water-cooled exhaust housing 28. The particular combination disclosed herein, Fig. 1, of the exhaust housing 28, with its radial outlet 112, enclosing the axially extending inlet pipes 118' and the axial turbine discharge, produces a gas flow path indicated by dotted line 118a which crosses itself, thus effecting a partial heat recovery operation, as well as providing a very compact unit.

Nozzle support housing 29 is thermo-elastically supported, as already described, by radial pins 109 disposed in radial holes 124 adjacent to bolting flange 108 and also by bored axial sockets 117 in exhaust housing end plate 116. Each of the multiple chambers defined in Fig. 1, which comprise nozzle support housing 29, are separated at the point of exhaust gas entry in exhaust housing end plate 116 and are joined at the other extremity to form a continuous peripheral surface 119 into which is fitted symmetrical annular nozzle ring 32.

Nozzle ring 32 is fitted into the peripheral opening 119 of nozzle support housing 29 and is held in angular relationship thereto by means of axial pin 120, Fig. 2, and in radial relationship thereto by means of pilot 121. The assembly of nozzle ring 32 into nozzle support housing 29 is further effected by the axial pressure exerted thereon at surface 122 when the combination of nozzle ring 32, nozzle support housing 29 and water-cooled exhaust housing 28 are bolted to water-cooled back plate 27a of bearing support housing 27. Gas leakage sealing strip 123 is made effective only when the aforesaid assembly is in effect.

From the disclosure herein, it is seen that I have provided a turbocharger having a highly effective relationship of turbine, compressor and supporting shaft elements whereby the turbine is adapted to absorb efficiently the kinetic energy of the exhaust gases while maintaining the stresses at a minimum in the various critical parts. In addition, my improved turbocharger allows the nozzle ring to be easily and readily removed in a radial inlet type of turbine and at the same time insure maximum effectiveness against leakage of gas and oil vapor or dangerous mixing thereof.

It will, of course, be understood by those skilled in the art that various changes may be made in the construction and arrangement of parts without departing from the spirit of the invention as set forth in the appended claims.

I claim:

1. A turbocharger comprising, in combination, a turbine wheel having rear and front sides with radial inlet blades on the front side, a shaft for rotatably supporting said wheel, a compressor impeller mounted on said shaft, a nozzle ring housing radially surrounding said turbine wheel for supplying gas thereto, a nozzle ring disposed radially adjacent to the turbine inlets and having axially extending nozzle vanes and annular members connected to the ends thereof, means for supporting said nozzle ring by said housing, an enclosure for the nozzle ring housing, said enclosure having a rear part adjacent to the rear side of the turbine wheel and a forward part adjacent to the front part of the turbine wheel and communicating with the discharge end of the turbine wheel to receive gas discharged therefrom, and annular sealing means interposed between the rear part of said enclosure and the nozzle ring to prevent the egress of high pressure gases from the nozzle ring into said enclosure.

2. A turbocharger comprising, in combination, a turbine wheel having a hub with a substantially radially extending back side and a front side with blades curved to axially discharge the issuing gases and an inlet to receive gasses in a substantially radial direction, means providing four inlets for supplying gas to the turbine wheel, a shaft for rotatably supporting said turbine wheel, a compressor impeller provided with a hub having an air flow deflecting surface turning the incoming air from an axial direction at its tip inlet near the hub axis to a radial direction at its discharge end and impeller vanes having a portion lying substantially in a meridian plane containing the impeller axis and another portion warped relatively to such plane, shaft bearings respectively adjacent to the turbine wheel and to the impeller, said wheel and shaft being so proportioned that with the maximum diameter of the turbine wheel considered as unity the axial length of the wheel is between .291–.388 of unity, the outer diameter of the turbine wheel at its discharge end is between .814–.763 of unity, the distance from the back face of the turbine wheel to the center of the shaft bearing adjacent the turbine wheel is between .214–.200 of unity, the distance between the centers of said bearings is between .560–.525 of unity, and the diameter of the shaft adjacent the turbine bearing is between .200–.219 of unity.

3. The combination set forth in claim 2 further characterized in that the impeller hub at its tip inlet end has a diameter between .254–.238 of unity and the maximum diameter of the impeller blades at their inlet ends is .627–.538 of unity.

4. A turbocharger comprising, in combination, a turbine wheel, a shaft rotatably supporting said wheel, a nozzle ring housing radially surrounding said turbine wheel for supplying gas thereto, an exhaust housing enclosing said nozzle ring housing, and means for thermo-elastically radially supporting said ring housing by said exhaust housing.

5. The combination set forth in claim 4 further characterized in that the thermo-elastic means comprises pins supported in the exhaust housing and extending radially to the ring housing.

6. The combination set forth in claim 4 further characterized in that said exhaust housing has an end wall, and means for axially movably supporting the nozzle ring housing substantially at the center of said wall.

7. The combination set forth in claim 4 further characterized in that the nozzle ring housing includes a plurality of inlet pipes initially extending in an axial direction and curving radially inward to the nozzle ring, an end wall for the exhaust housing, and means for slidably supporting the axial portion of said inlet pipes by said end wall.

8. A turbocharger comprising, in combination, a bearing housing, a shaft journalled therein, a turbine wheel mounted on one end of said shaft, a nozzle ring housing surrounding said turbine wheel for supplying gas thereto, an exhaust housing enclosing said nozzle ring housing, and means for removably axially supporting said exhaust housing by said bearing housing whereby upon removal of said exhaust and nozzle ring housings the turbine wheel is axially removable.

9. A turbocharger comprising, in combination, a turbine wheel having a radial inlet and axial discharge, a shaft rotatably supporting said wheel, a nozzle ring for supplying gas radially inward through said inlet, a plurality of inlet pipes connected to said ring, the initial portion of said pipes extending in an axial direction relative to the shaft axis so that the gases supplied to and discharged from the turbine flow in directions toward each other, and an exhaust housing enclosing said inlet pipes and having a radial outlet, whereby gases flow axially toward the turbine wheel and thence radially inwardly thereof to be discharged therefrom in an axial direction toward the initial axial portion of the pipes and thence radial outward from the exhaust housing.

ANTHONY J. LARRECQ.

References Cited in the file of this patent

UNITED STATES PATENTS

| Number | Name | Date |
| --- | --- | --- |
| 1,692,537 | Baumann | Nov. 20, 1928 |
| 1,959,703 | Birmann | May 22, 1934 |
| 2,184,197 | Schutte | Dec. 19, 1939 |
| 2,296,701 | Butler et al. | Sept. 22, 1942 |
| 2,406,388 | Larrecq | Aug. 27, 1946 |
| 2,445,661 | Constant | July 20, 1948 |
| 2,447,292 | Van Acker | Aug. 17, 1948 |
| 2,463,976 | Kilchenmann | Mar. 8, 1949 |
| 2,475,151 | Nichols | July 5, 1949 |
| 2,486,731 | Buchi | Nov. 1, 1949 |
| 2,492,672 | Wood | Dec. 27, 1949 |
| 2,516,066 | McLeod | July 18, 1950 |
| 2,556,020 | Williams | June 5, 1951 |
| 2,577,179 | Buchi | Dec. 4, 1951 |

FOREIGN PATENTS

| Number | Country | Date |
| --- | --- | --- |
| 589,689 | Great Britain | June 26, 1947 |